Oct. 16, 1934.    S. F. WESTON    1,977,603
GAUGE GLASS
Filed Feb. 6, 1934    2 Sheets-Sheet 1

INVENTOR
Sidney Frank Weston
BY
ATTORNEY

Oct. 16, 1934.   S. F. WESTON   1,977,603
GAUGE GLASS
Filed Feb. 6, 1934   2 Sheets-Sheet 2

INVENTOR
Sidney Frank Weston
BY
ATTORNEY

Patented Oct. 16, 1934

1,977,603

UNITED STATES PATENT OFFICE 1,977,603

GAUGE GLASS

Sydney Frank Weston, Finchley, London, England, assignor to The Babcock & Wilcox Company, Newark, N. J., a corporation of New Jersey Application February 6, 1934, Serial No. 709,912
In Great Britain August 10, 1932

4 Claims. (Cl. 73—54)

My invention relates to glasses for indicating the liquid level in an associated container and is particularly concerned with gauge glasses for indicating the water level in the steam and water drum of a steam boiler. Due to the increase in size of modern steam boilers and the increased height of setting, the distance from the firing floor to the gauge glass has increased, and in order to facilitate easy reading of the water level, illuminating fittings for such gauge glasses have been introduced.

The main object of my invention is the provision of a gauge glass of the illuminated type with an improved construction and arrangement of the illuminating fitting, whereby the height of the column of liquid in the gauge glass may be readily and accurately determined when viewed from a substantial distance below or directly opposite the gauge glass.

In accordance with my invention a casing is mounted at the rear of the gauge glass to contain a source of light which is positioned to illuminate the gauge glass through the medium of a coloured screen, a mirror or reflector being provided whereby certain of the rays from the source of light may be reflected, either directly or through the medium of a further screen of different colour, on to the meniscus of the liquid column which is thus clearly defined against a background of different colour. A lens is also provided in front of the gauge glass whereby the meniscus may be suitably amplified.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 1:
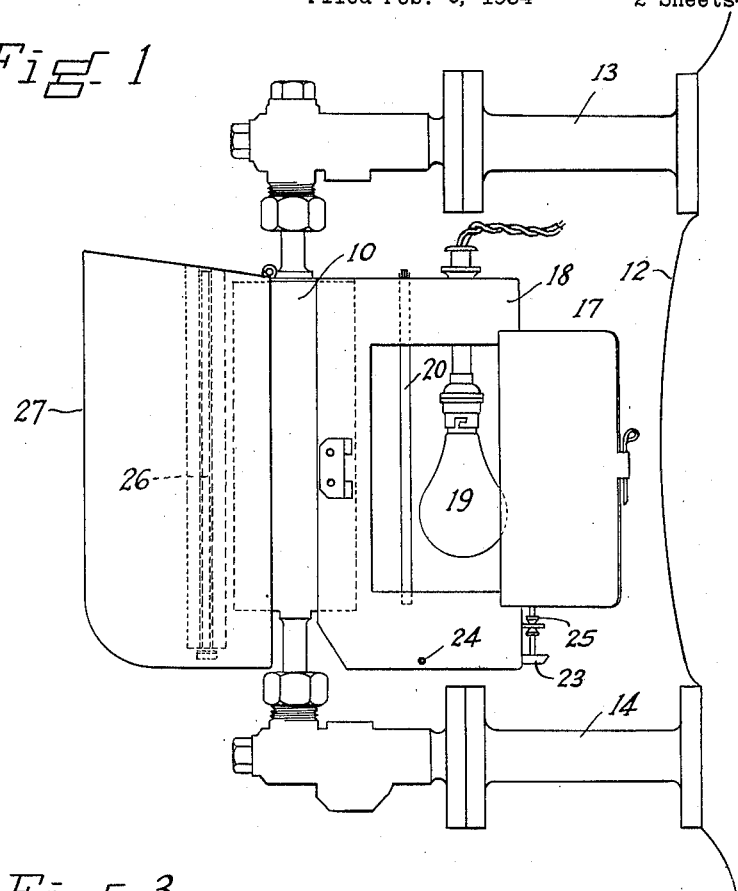
Fig. 1 is an elevation of a plate type water gauge glass for a boiler steam and water drum equipped with an illuminating fitting in accordance with my invention.

The water gauge illustrated in the drawings is of the plate type and consists of a body or holder member 10 having an internal channel 11 for the reception of water from the steam and water drum 12 of a steam boiler to the steam and water spaces of which it is connected by pipes 13 and 14 respectively in a well known manner. The front and rear sides of the channel 11 are closed by similar sight glasses 15 held in position by a pair of clamping members 16.

Figure 3:
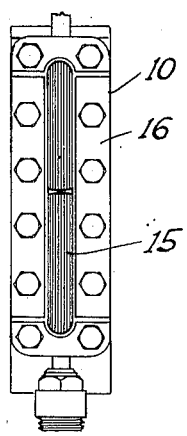
Fig. 3 is a front view of the gauge glass without the hood and magnifying lens.
Figure 4:
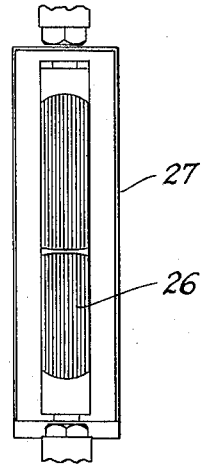
Fig. 4 is a front view showing the effect of the addition of the hood and magnifying lens.
Figure 2:
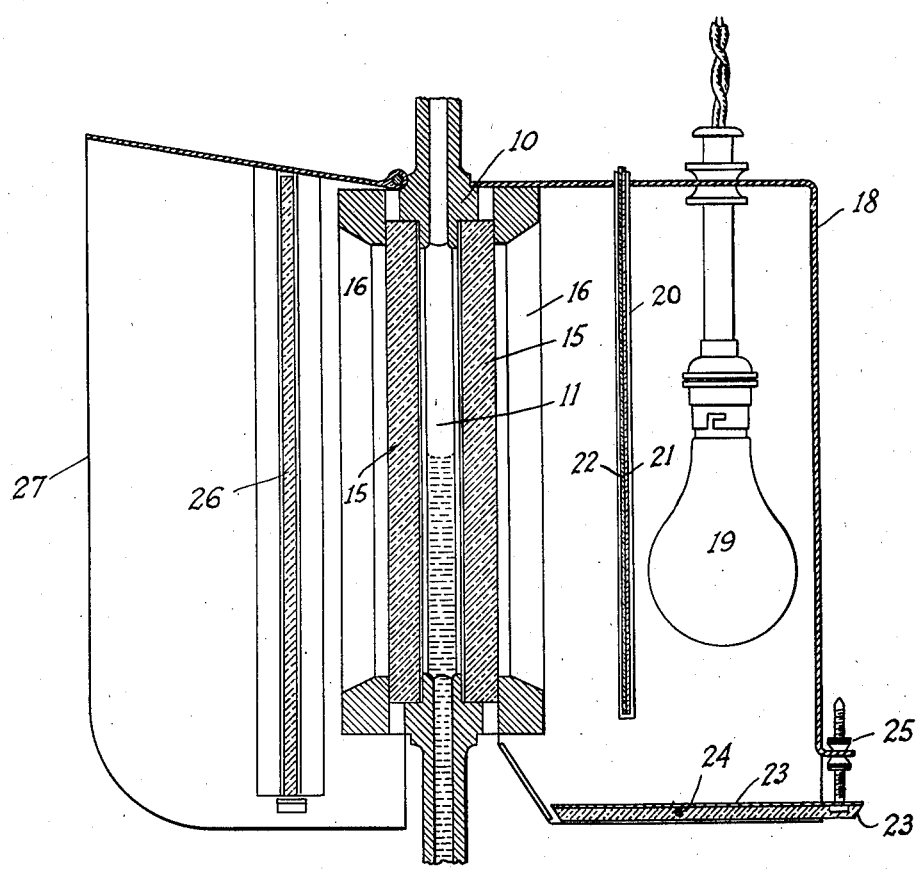
Fig. 2 is a vertical section of a portion of the apparatus shown in Fig. 1.

Attached to the back of the gauge glass there is provided a casing 18 containing a suitable source of artificial light, such as an electric lamp 19, adapted to be replaced through a side door 17. The walls of the casing surrounding the lamp are preferably enamelled white. To the top and side walls of the casing 18 is attached a screen 20 consisting of a sheet of opaline 21 (white translucent glass) and a sheet of coloured glass or other transparent coloured medium 22, whereby the channel 11 in the gauge glass will be illuminated. The screen 20 is suitably spaced from the rear side of the gauge glass and terminated short of the bottom of the casing 18. At the bottom of the casing 18 there is provided a mirror or reflector 23 pivoted at a point 24 and adapted to be adjusted to the correct angle by means of a thumbscrew 25 so that rays of white light from the lamp 19 will be reflected upwardly at an angle over the operative length of the gauge glass. I have discovered that this arrangement will cause the meniscus of the water column to be clearly defined in white light against the coloured background provided by the passage of light from the lamp 19 through the coloured screen 20, as indicated in Figs. 3 and 4.

To facilitate the reading of the gauge glass, a magnifying lens 26 extending throughout the length of the gauge glass channel for magnifying the image is mounted in a shield or hood 27 attached to the front of the gauge glass. The shield 27 will protect the gauge from direct impingement of sun-rays or other bright light.

Although a ruby coloured sheet of glass 22 has been found to give the most striking results, screens of other colours such as deep green or blue may equally be used. With ruby coloured glass in use, the meniscus will show up brilliantly in white against a ruby coloured background over the full length of the water column.

While in accordance with the provisions of the statutes I have illustrated and described herein the best form of my invention known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. An illuminator for a gauge glass having a channel formed therein and arranged to contain a liquid column of varying height comprising a casing mounted at the rear of said gauge glass and containing a source of artificial light and a colored translucent screen between the source of light and the gauge glass channel adapted to illuminate the latter, and a reflector arranged to reflect a portion of the light from said source on and at a vertical angle to the meniscus of the liquid column, whereby the meniscus will be defined against a background of a different colour.

2. An illuminator for a gauge glass having a channel formed therein and arranged to contain a liquid column of varying height comprising a casing mounted at the rear of said gauge glass and containing a source of artificial light and a coloured translucent screen between the source of light and the gauge glass channel adapted to illuminate the latter, said screen being spaced from the rear side of said gauge glass channel and having its lower end terminating short of the bottom of said casing, and a reflector in the bottom of said casing arranged to reflect a portion of the light from said source upwardly through the space between said gauge glass and said screen on to the meniscus of the liquid column, whereby the meniscus will be defined against a background of a different colour.

3. An illuminator for a gauge glass having a channel formed therein and arranged to contain a liquid column of varying height, said channel being visible at its front and rear sides through front and rear sight glasses respectively, comprising a casing mounted at the rear of said gauge glass and containing a source of artificial light and a screen between said source of light and said gauge glass channel adapted to illuminate the latter, said screen being rearwardly spaced from said rear sight glass and having its lower end terminating short of the bottom of said casing and comprising a rear sheet of white translucent glass and a front sheet of coloured translucent glass, and an adjustable reflector in the bottom of said casing arranged to reflect a portion of the light from said source upwardly through the space between said rear sight glass and said screen on to the meniscus of the liquid column, whereby the meniscus will be defined against a background of a different colour.

4. An illuminator for a gauge glass having a channel formed therein and arranged to contain a liquid column of varying height comprising a casing mounted at the rear of said gauge glass and containing a source of artificial light and a coloured translucent screen between said source of light and said gauge glass channel adapted to illuminate the latter, a reflector arranged to reflect a portion of the light from said source on and at a vertical angle to the meniscus of the liquid column, whereby the meniscus will be defined against a coloured background, a light-shielding hood arranged in front of said gauge glass, and a magnifying lens positioned in said hood and arranged to amplify the image of said meniscus.

SYDNEY FRANK WESTON.